US008483046B2

(12) United States Patent  
DeCusatis

(10) Patent No.: US 8,483,046 B2
(45) Date of Patent: Jul. 9, 2013

(54) VIRTUAL SWITCH INTERCONNECT FOR HYBRID ENTERPRISE SERVERS

(75) Inventor: Casimer M. DeCusatis, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 303 days.

(21) Appl. No.: 12/893,275

(22) Filed: Sep. 29, 2010

(65) Prior Publication Data

US 2012/0076006 A1 Mar. 29, 2012

(51) Int. Cl.
*H04L 12/26* (2006.01)

(52) U.S. Cl.
USPC .......................................... 370/217; 370/235

(58) Field of Classification Search
USPC .......... 370/217–229, 250, 252, 437, 449–450, 370/465
See application file for complete search history.

(56) References Cited

U.S. PATENT DOCUMENTS

| 6,456,597 | B1 * | 9/2002 | Bare ............................... 370/252 |
| 6,868,080 | B1 * | 3/2005 | Umansky et al. .............. 370/354 |
| 7,359,332 | B2 * | 4/2008 | Kolze et al. .................... 370/252 |
| 7,613,392 | B2 * | 11/2009 | Gerstel ............................. 398/5 |
| 7,760,668 | B1 | 7/2010 | Zinjuvadia |
| 8,018,848 | B2 * | 9/2011 | Baker et al. .................... 370/230 |
| 8,208,370 | B1 * | 6/2012 | Mitchell et al. ................ 370/217 |
| 2003/0016624 | A1 * | 1/2003 | Bare .............................. 370/217 |
| 2005/0195807 | A1 * | 9/2005 | Rao et al. ....................... 370/386 |
| 2008/0049610 | A1 * | 2/2008 | Linwong et al. .............. 370/225 |
| 2008/0089245 | A1 | 4/2008 | Reichstein et al. |
| 2008/0089246 | A1 | 4/2008 | Ghanwani et al. |
| 2008/0219174 | A1 | 9/2008 | Ribeiro |
| 2008/0279096 | A1 | 11/2008 | Sullivan et al. |
| 2009/0190503 | A1 | 7/2009 | Tallet et al. |
| 2009/0274155 | A1 | 11/2009 | Nakash |
| 2009/0296565 | A1 | 12/2009 | Kuo et al. |
| 2010/0040070 | A1 | 2/2010 | Suh et al. |
| 2010/0128603 | A1 | 5/2010 | Kulkarni et al. |

OTHER PUBLICATIONS

Huynh et al; "A Scalable Hybrid Approach to Switching in Metro Ethernet Networks"; LCN 32nd IEEE Conference on Oct. 15-18, 2007; pp. 436-443.
Maddeb, A.; "Smart Spanning Tree Bridging for Carrier Ethernet"; Global Telecommunications Conference on Nov. 30-Dec. 4, 2008; pp. 1-5.

* cited by examiner

*Primary Examiner* — Kevin Mew
(74) *Attorney, Agent, or Firm* — Cantor Colburn LLP; Steven Chiu

(57) ABSTRACT

A system for network configuration that includes a first processor coupled to a second processor via a network. The network includes a plurality of switches and links between the switches to offload processing from the first processor to the second processor. The switches include at least one virtual switch. The first processor is configured to perform a method that includes receiving network configuration data and switch state information for the network. It is detected that a first link and a second link provide two different paths between two of the switches. The first link is selected, at the computer, as a primary link based on contents of the network configuration data. The second link is deactivated in response to the selecting.

2 Claims, 9 Drawing Sheets

VIRTUAL SWITCH INTERCONNECT FOR HYBRID ENTERPRISE SERVERS

BACKGROUND

The present invention relates generally to computers, and more specifically to hybrid enterprise servers.

Enterprise servers having a variety of different architectures are currently available on the market. Typically, certain architectures are more efficient at executing one or more particular types of workloads (e.g., on-line transactions, graphics intensive applications such as engineering design tools, etc.). In computer configurations that include servers with different architectures (i.e., hybrid enterprise servers), attempts are often made to place workloads on the server best suited to the workload. For example, International Business Machines Corporation (IBM) has recently introduced a new architecture known as zHybrid or zBx. The zBx architecture uses a System X® BladeCenter® server as an offload processor to a System Z® server for certain types of workloads. The ability to move workloads between servers allows each server to be employed for the types of workloads that each is best suited to execute. Current implementations of the zBx architecture require a private Ethernet network to interconnect a System z server and a BladeCenter server.

SUMMARY

An embodiment is a system for network configuration. The system includes a first processor coupled to a second processor via a network. The network includes a plurality of switches and links between the switches to offload processing from the first processor to the second processor. The switches include at least one virtual switch. The first processor is configured to perform a method that includes receiving network configuration data and switch state information for the network. It is detected that a first link and a second link provide two different paths between two of the switches. The first link is selected, at the computer, as a primary link based on contents of the network configuration data. The second link is deactivated in response to the selecting.

Additional features and advantages are realized through the techniques of the present embodiment. Other embodiments and aspects are described herein and are considered a part of the claimed invention. For a better understanding of the invention with the advantages and features, refer to the description and to the drawings.

BRIEF DESCRIPTION OF THE SEVERAL VIEWS OF THE DRAWINGS

The subject matter that is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

An embodiment of the present invention provides a virtual interconnect for multiple switches within a hybrid server architecture.

Figure 1:
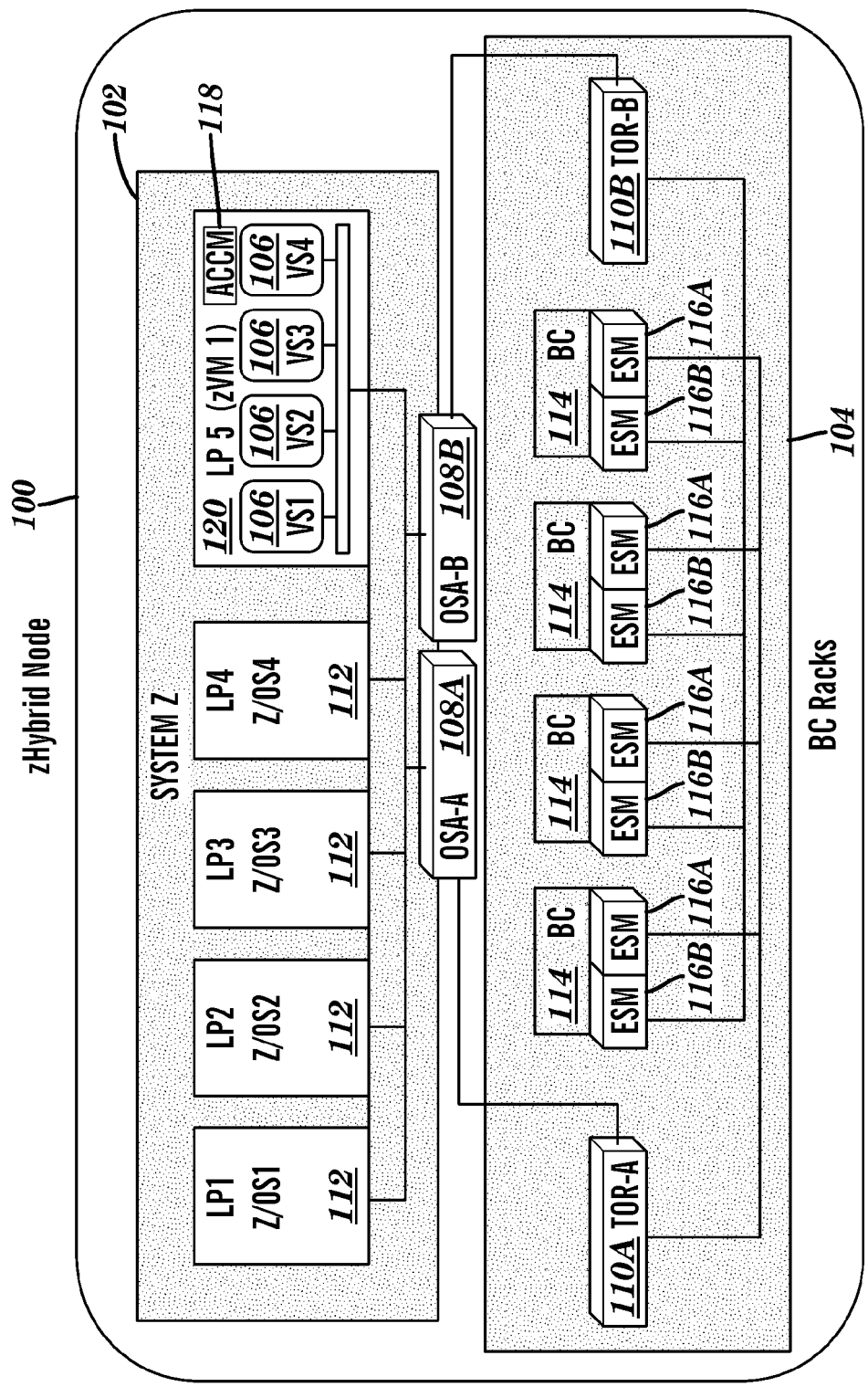
FIG. 1 depicts a zHybrid system that may be implemented in accordance with an embodiment.

FIG. 1 depicts a zHybrid system that may be implemented in accordance with an embodiment. The zHybrid node 100 depicted in FIG. 1 includes a System z server 102 and a BladeCenter server 104. The BladeCenter server 104 includes several BladeCenter processors 114, a top of rack (TOR) switch 110A, and a redundant TOR switch 110B. As known in the art, a TOR switch refers to a switch that typically has a low number of ports (48 or less) and may be used as an access switch to collect traffic from a single rack of servers. Each BladeCenter processor 114 depicted in FIG. 1 includes two Ethernet switching modules (ESMs), one ESM 116A for communicating with TOR switch 110A, and a redundant ESM 116B for communicating with redundant TOR switch 110B.

As shown in FIG. 1, the TOR switches 110 are coupled to Open Systems Adapters (OSAs) 108 for connecting the BladeCenter server 104 to the System z server 102. In an embodiment, the OSAs 108 are Ethernet adapters cards, with OSA 110A being connected to TOR 110A and OSA 110B being connected to TOR 110B for back-up purposes.

The System z server 102 depicted in FIG. 1 includes several logical partitions 112, labeled LP1, LP2, LP3, and LP4. FIG. 1 also includes a virtual switch (VSwitch) logical partition 120 labeled LP5, for executing a plurality of virtual switches 106, labeled VS1, VS2, VS3, and VS4. As shown in FIG. 1, the virtual switches 106 are coupled to the other logical partitions 112 and to the OSAs 108. As used herein, the term "virtual switch" refers to software that is executed by a computer to simulate a physical switch. In the embodiment shown in FIG. 1, there is one virtual switch 106 corresponding to each of the logical partitions 112, and the virtual switches 106 share a common bus. Other configurations may also be implemented by other embodiments, for example, two or more of the logical partitions 112 may share one virtual switch 106 and/or two or more of the virtual switches 106 may have dedicated busses exiting the VSwitch logical partition 112 and coupled to the OSAs 108.

Also shown in FIG. 1 is an automated-configuration code module (ACCM) 118 in the Vswitch logical partition 120. The ACCM 118 is utilized to configure an Ethernet network that connects the System z server 102 to the BladeCenter server 114. In another embodiment, the ACCM 118 executes in one of the other logical partitions 112 or is executed by a hypervisor (not shown in FIG. 1) located on the System z server 102.

In an embodiment, a System x BladeCenter server 104 is used as an offload processor to a System z server 102 for certain types of workloads, such as real time analytics. This allows both the System z and the BladeCenter to be employed for the types of workloads that each is best suited to execute.

The embodiments described herein use the IBM zHybrid architecture, System z servers, and BladeCenter servers for explanation purposes. As used herein, a System z server is an example of an enterprise server and a BladeCenter server is an example of an Intel x86 server. It will be appreciated that alternative embodiments may be implemented by any hybrid architecture that includes servers that communicate with each other via an Ethernet network. Examples of other servers that may be implemented by embodiments include hybrids between blade servers, Intel x86 servers, and/or IBM's Power Architecture® servers.

In an embodiment, the TOR switches 110 are implemented using 1 G (gigabyte) and 10 G Ethernet switches from Juniper Networks, Incorporated. Other types of Ethernet switches that are compatible with network auto-configuration code running on a System z processor may also be utilized by embodiments, such as, but not limited to, access, aggregation, and core switches. As shown in FIG. 1, two switches (a primary switch and a backup switch) are interconnected for high availability and redundancy. In another embodiment, up to ten switches are interconnected. In an embodiment, a primary switch is dedicated to a subset of the BladeCenter servers 114 and two or more of the subsets share a redundant switch. It will be appreciated that numerous configurations may be implemented to provide an Ethernet connection between the System z server 102 and the BladeCenter server 104.

Embodiments described herein utilize an Ethernet network. Any type of Ethernet network may be implemented, including, but not limited to: a converged enhanced Ethernet (CEE) network; a conventional Ethernet network running TCP/IP protocols; an iWarp network; or other protocols encapsulated within or running on top of an Ethernet network.

Figure 2:
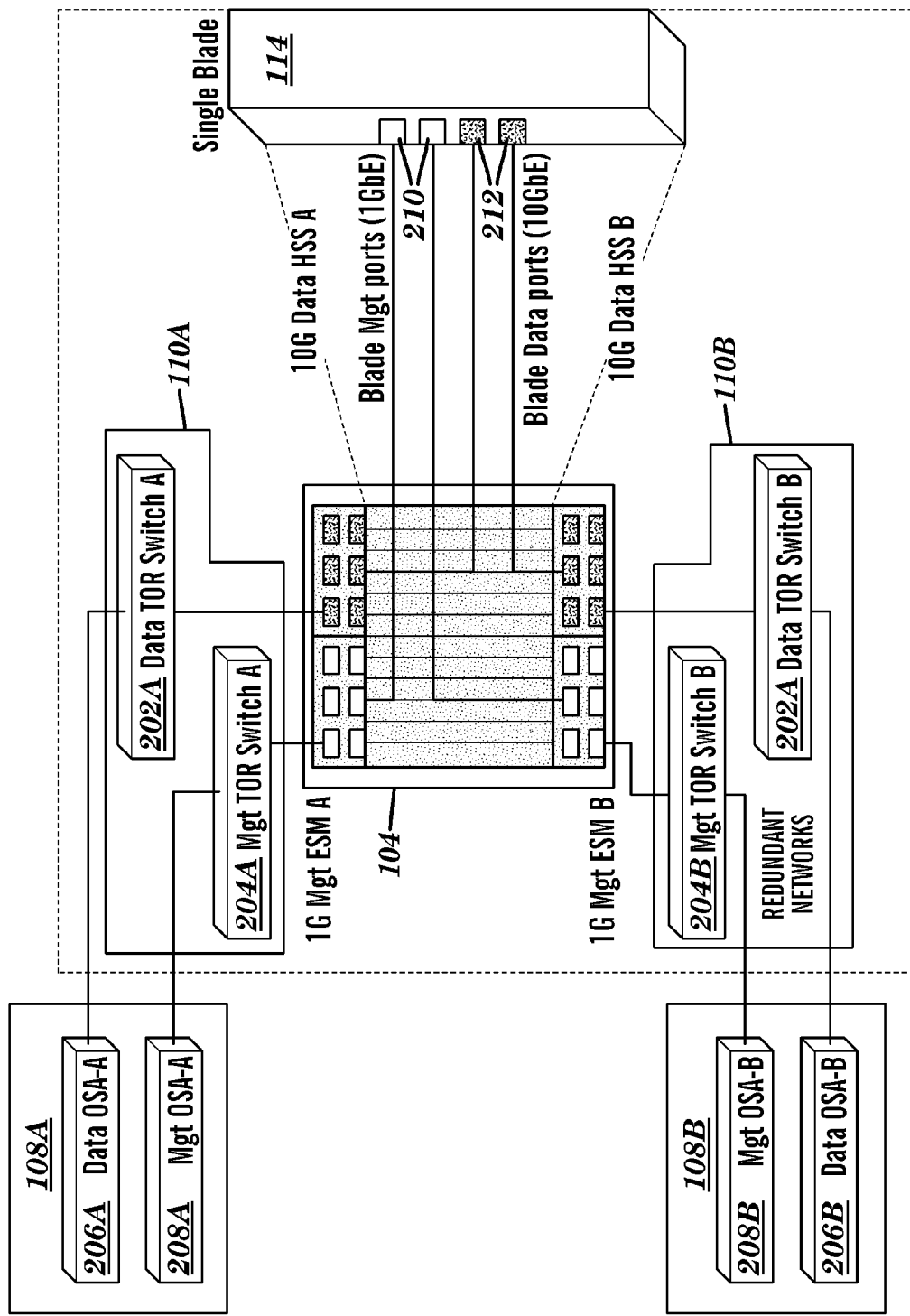
FIG. 2 depicts another view of the embodiment of the BladeCenter server depicted in FIG. 1.

FIG. 2 depicts another view of the embodiment of the BladeCenter server 104 depicted in FIG. 1. As shown in FIG. 2, the BladeCenter processor 114 includes four network interface card (NIC) ports (two 1 G Etherent management ports 210 and two 10 G Ethernet data ports 212) that are connected to four integrated switches. As shown in FIG. 2, both TOR switch 110A and TOR switch 110B include a TOR data switch 202 and a TOR management switch 204. In an embodiment, the data switches 202 are implemented by 10 G high speed switches (HSSs) and the management switches 204 are implemented by 1 G ESMs. As shown in FIG. 2, both OSA 108A and OSA 108B include a data OSA 206 and a management OSA 208. In an embodiment, the data OSAs 206 are coupled to the TOR data switches 202 to transfer data, and the management OSAs 208 are coupled to the TOR management switches 204 to provide network management.

It is desirable to be able to manage all of the TOR switches 110 switches for one or more hybrid nodes from a common management console. Some switch vendors have proposed management options that virtualize the interconnection between multiple switches, but these are not compatible with other auto-configuration features in a hybrid design, and may also have other disadvantages such as having an additional cost and requiring additional cables, for example. Further, currently proposed solutions, where all of the switches are treated as one unit for management purposes, do not permit concurrent upgrade of the switch code and the entire virtual chassis needs to be rebooted whenever the code is upgraded.

An embodiment described herein utilizes rapid spanning tree protocol (RSTP) as a failover mechanism. Multiple root switches are defined for this topology, using physically redundant cables (or links) to interconnect the root switches. The redundant links result in loops in the network and RSTP is utilized to detect the locations of loops. An embodiment then deactivates any redundant links between roots, leaving the primary root (as specified in a network configuration file) activated. If the primary link fails (or is otherwise deactivated, for example due to maintenance actions or re-plugging cables), this condition is detected by RSTP and a redundant link is re-activated.

Figure 3:
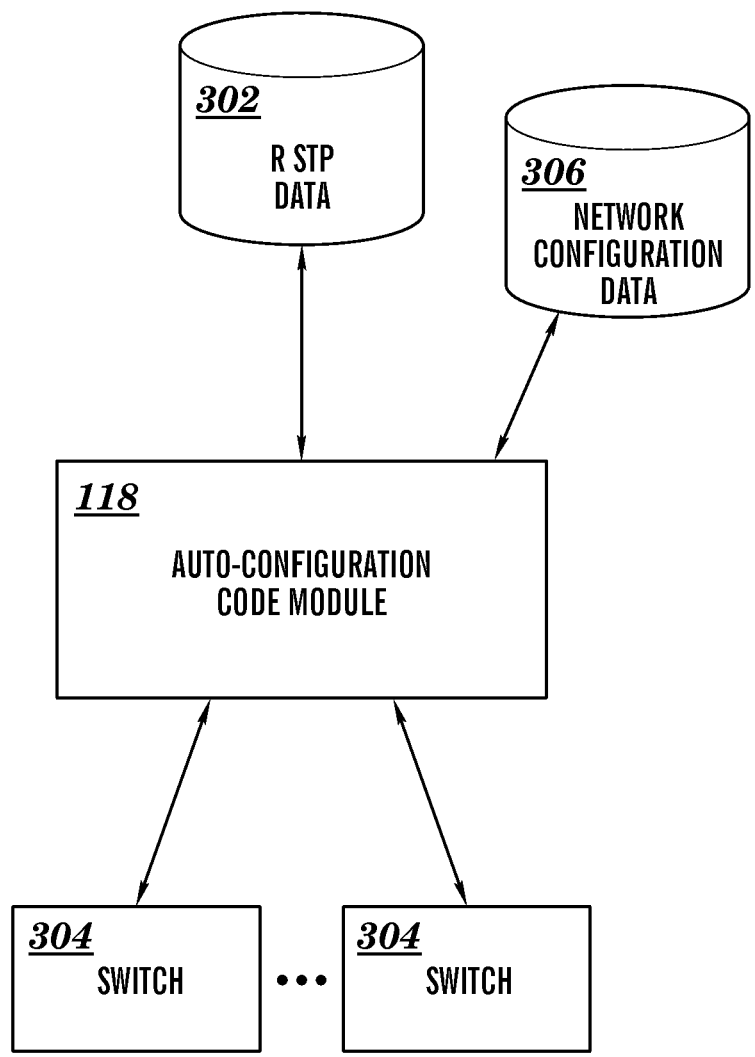
FIG. 3 illustrates a block diagram of a configuration in accordance with an embodiment for performing automatic configuration functions.

FIG. 3 illustrates a block diagram of a configuration in accordance with an embodiment for performing automatic configuration functions using the ACCM 118. As shown in FIG. 3, the ACCM 118 receives RSTP data 302 and network configuration data 306, and generates instructions that are output to switches 304 in the network. As known in the art, RSTP executes on the switches 304 and initiates the exchange of bridge protocol data units (BPDUs) to gather status information about network elements. All or a subset of this gathered information is stored as the RSTP data 302 of FIG. 3. In an embodiment, RSTP data 302 includes, but is not limited to, bridge identifiers, port numbers, path cost data, or bridge protocol data units.

In an embodiment, the network configuration data 306 is stored on the System z server 102 and includes information about default network settings (e.g., identity of primary links, etc.). The network configuration data includes of a set of default values. In am embodiment, the configuration data is configured through the System Z hardware management console and stored in the System Z memory. The switches 304 shown in FIG. 3 include both root switches and leaf switches.

An embodiment of the ACCM 118 performs several functions, including but not limited to: configuring an Ethernet network with the required access control lists, media access control and IP address information.

Figure 4:
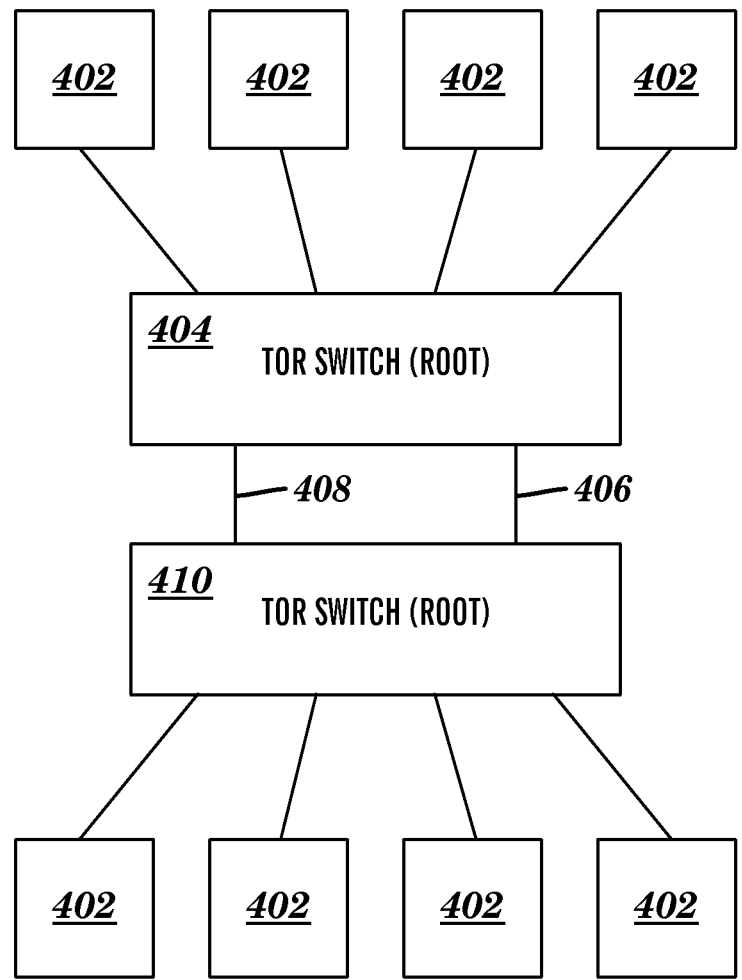
FIG. 4 illustrates a block diagram of a network topology that may be implemented in accordance with an embodiment.

FIG. 4 illustrates a block diagram of a network topology that may be implemented in accordance with an embodiment. The topology depicted in FIG. 4 includes root switch 404 and root switch 410 interconnected by a first link 406 and a second link 408. The block diagram in FIG. 4 also includes one group of leaf switches 402 coupled to root switch 404 and another group of leaf switches 402 coupled to root switch 404. In an embodiment, each of the root switches 404 and 410 is implemented by a TOR switch, such as TOR switch 110 in FIG. 1. In an embodiment, root switch 404 is from one server (e.g., a System z server) and root switch 410 is from another server (e.g., a BladeCenter server). For clarity of explanation, root switches from only two servers are illustrated in FIG. 4, however it should be understood that the same principles apply to configurations with more than two servers (e.g., four, eight, twelve, sixteen, etc.) communicating via an Ethernet network.

As shown in FIG. 4, root switch 404 and root switch 410 are interconnected by two links: first link 406 and second link 408. As is known in the art, an Ethernet network does not support a loop in the traffic flow and thus the first link 406 and the second link 408 cannot be active at the same time.

Figure 5:
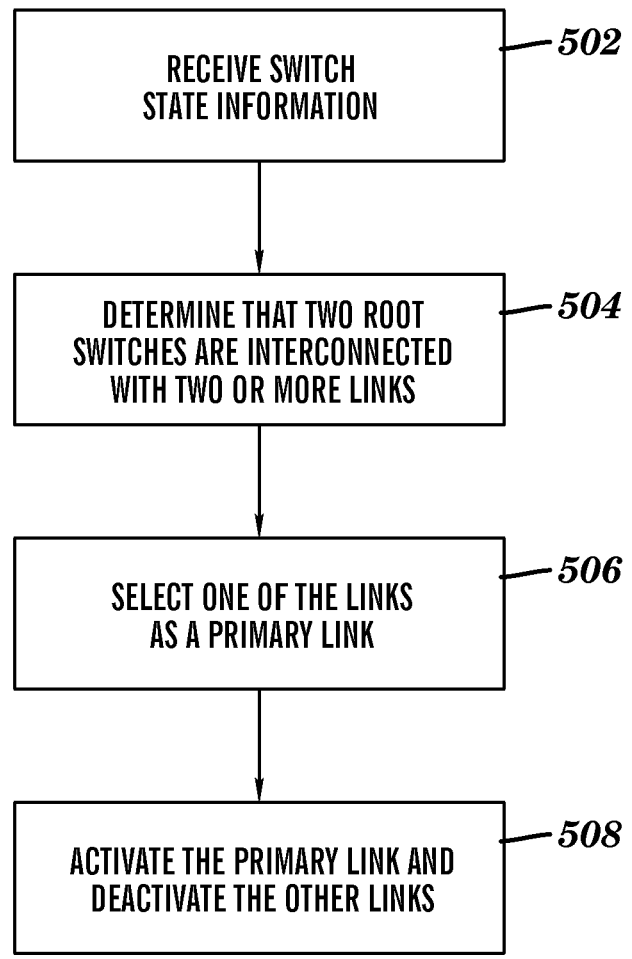
FIG. 5 depicts a process flow that in accordance with an embodiment to select a primary link for routing network traffic.

FIG. 5 depicts a process flow that is implemented by the ACCM 118 in accordance with an embodiment to select a primary link for routing network traffic between root switch 404 and root switch 410. At block 502, switch state information is received (e.g., RSTP data) and it is determined that there is a loop between root switch 404 and root switch 410. At block 506, either the first link 406 or the second link 408 is selected as the primary link 506. In an embodiment, the selection of the primary link is based on which link is specified as the primary link in the network configuration data 306. At block 508, the selected link is activated as the primary link, and the other link is deactivated. The process depicted in FIG.

5 may be implemented at system start-up and/or upon a change to the network configuration. By performing the process depicted in FIG. 5, the ACCM 118 insures that a primary link specified by the network configuration data 306 is consistently selected upon system start-up or upon the addition/deletion/removal of a switch. This insures that the primary link will have the lowest latency (most direct connection) between the hybrid server elements, which will not necessarily be the case if only RSTP is allowed to select the working link.

Figure 6:
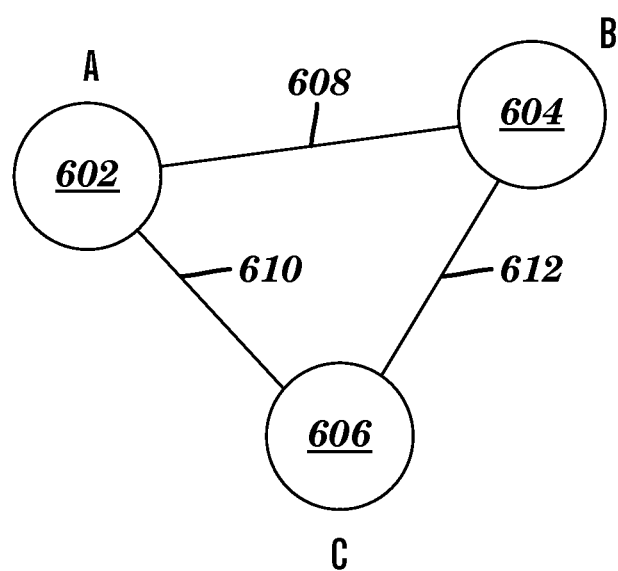
FIG. 6 depicts a block diagram of a link aggregation group (LAG)

An embodiment of the ACCM 118 also insures that well-behaved topologies are maintained during operation of the Ethernet network. FIG. 6 depicts a block diagram of a link aggregation group (LAG) that includes server node A 602, server node B 604, and server node C 606; as well as link AB 608, link CB 612 and link AC 610. For the initial configuration shown in FIG. 6, a network loop is formed between link AB 608, and link AC 610 to link CB 612. As described previously with respect to FIGS. 4 and 5, the ACCM 118 only allows one of these two links to persist after setup (in this case, the single-hop path AC 610) and deactivates link AB 608. In the event that primary link AC 610 is lost, link AB 608 will activate and the topology will reconverge to a stable configuration.

Figure 7:
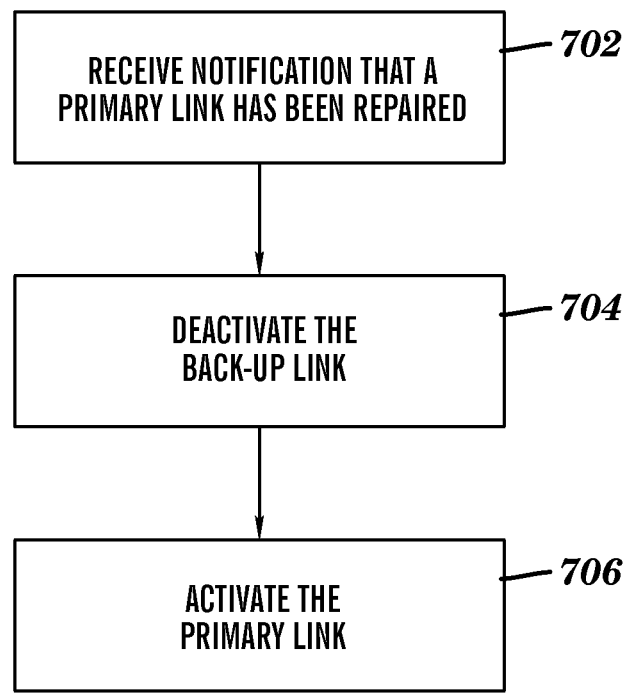
FIG. 7 depicts a process flow that is implemented in accordance with an embodiment to revert back to the primary link for routing network traffic after the primary link has been repaired.

FIG. 7 depicts a process flow that is implemented by the ACCM 118 in accordance with an embodiment to revert back to the primary link for routing network traffic after the primary link has been repaired. At block 702, the ACCM 118 is notified that a primary link (e.g., link AC 610) has been repaired. In an embodiment, the ACCM 118 is notified of the repair by the RSTP via received RSTP data 302. At block 704, a back-up link (e.g., link AB 608) is deactivated by the ACCM 118, and at block 704, the primary link (e.g., link AC 610) is reactivated by the ACCM 118.

An embodiment removes a portion of the time delay associated with replacement of the primary link while running on the secondary link. Once the secondary link is active, repair and reconnection of the primary link creates a network loop. It is necessary to turn off one of the two links (newly repaired primary or currently running backup); until this is done, packets may circle in the network loop, which is undesirable. The ACCM 118 corrects for this event by detecting the condition and forcing the (currently working) backup link offline, reactivating the (newly repaired) primary link.

Figure 8:
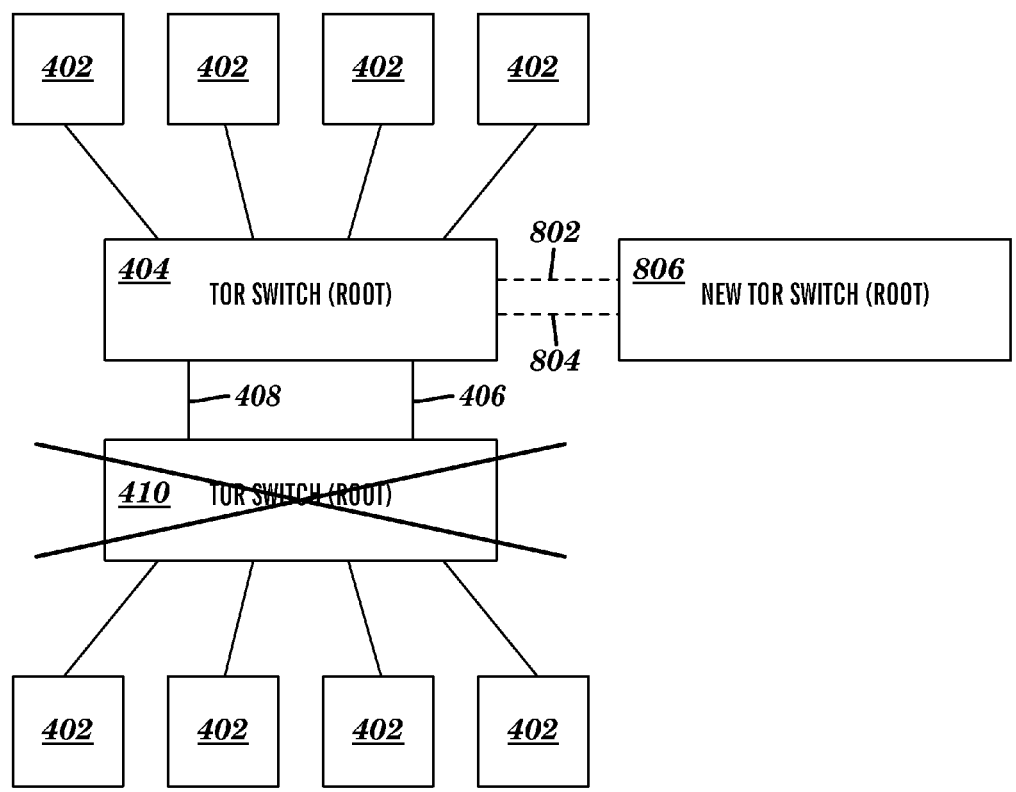
FIG. 8 is a block diagram that illustrates the removal of an existing root node and the addition of a new root node.

Removing or adding a new switch to the configuration as the hybrid architecture grows may require new root switches to be established; these new root switches may conflict with existing root switches. FIG. 8 illustrates the removal of an existing root node 410 and the addition of a new root node 806. As shown in FIG. 8, the new root switch 806 is installed (e.g., via management console executing on the System z server) with a first link 802 and a second link 804 to root switch 404. As described previously herein, one of these links will be activated by the ACCM 118 as the primary link and the other deactivated.

Figure 9:
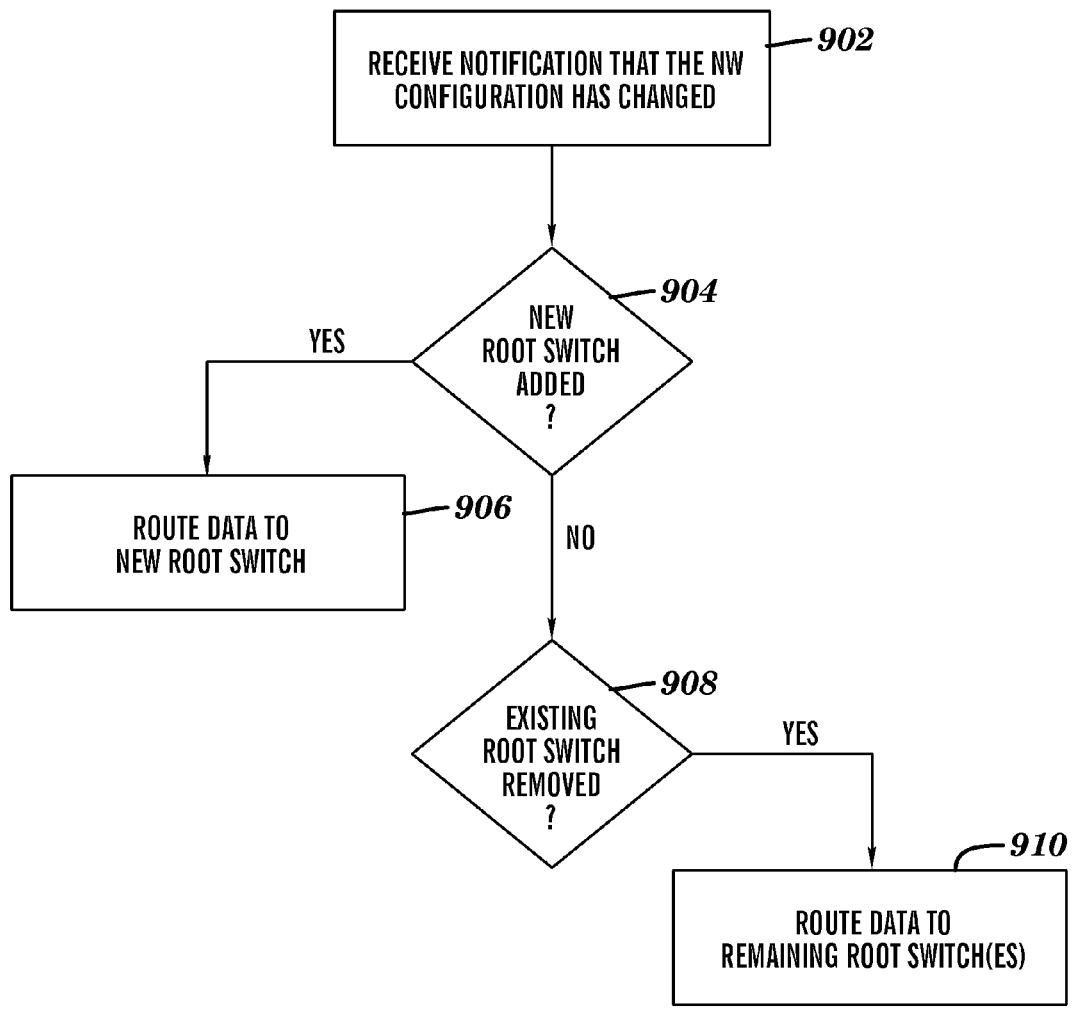
FIG. 9 depicts a process to adjust the weight and/or cost of link in the network.

FIG. 9 depicts a process implemented by the ACCM 118 in accordance with an embodiment to adjust the weight and/or cost of each link in the network so that the proper number of root switches are maintained. At block 920, the ACCM 118 is notified that the network configuration has changed. At block 904 it is determined if a new root switch has been added. If a new root switch has been added, the processing continues at block 906 by adjusting the weights of the links to force network traffic over a primary path to the new root switch. If a new root switch has not been added, as determined at block 904, block 908 is performed to determine if an existing root switch has been removed. If an existing root switch has been removed, then processing continues at block 910 to adjust the weights of the remaining links to route network traffic to the remaining root switches.

An embodiment of the ACCM 118 addresses a configuration issue for Internet Protocol version six (IPv6) under SuSE Linux. When the ACCM 118 advertises an IPv6 prefix, it needs to set the valid and preferred lifetime values; the host then takes the prefix and associated lifetime values and configures an IPv6 address on the appropriate interface. On a SUSE Linux host the valid lifetimes are not updated correctly; to correct for this, an embodiment of the ACCM 118 bounces the interface on the Linux host by executing an "ifconfig" command (in other words, forcing the interface to re-read the lifetime values a second time in order to make certain that they have been updated properly).

An embodiment of the ACCM 118 also addresses an issue that occurs because RSTP can cause the movement of channel media access control (MAC) addresses to take a long time, thus delaying movement of the Internet Protocol (IP) address as well. To reduce the delay, the ACCM 118 sends out gratuitous address resolution protocols (ARPs) when an IP address is moved to a new adapter card or port. The gratuitous ARPs are not required during normal operation of the network, and would not be transmitted under normal conditions. They are transmitted by the ACCM specifically to accelerate movement of the MAC address from one device to another.

An embodiment of the ACCM 118 has the capability of enabling/displaying RSTP on a per port basis. This allows migration functions, such as moving a virtual machine from one physical server to another to be performed more quickly. This prevents the RSTP from blocking ports when a DVIPA (dynamic virtual internet protocol address) is moved in a system that uses DVIPA across System z operating system images that share a 10 gigabit Ethernet network adapter.

Technical effects and benefits of embodiments described herein include the ability to upgrade or configure one switch in a multi-switch stack without disturbing the configuration of the remaining switches. Thus, it is only necessary to reboot the particular switch being updated, not all the associated switches in a stack.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flow diagrams depicted herein are just one example. There may be many variations to this diagram or the steps (or operations) described therein without departing from the spirit of the invention. For instance, the steps may be performed in a differing order or steps may be added, deleted, or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A system for network configuration, the system comprising:
a first processor coupled to a second processor via a network, the network comprising a plurality of switches and links between the switches to offload processing from the first processor to the second processor, the first processor configured to perform a method comprising:
receiving network configuration data and switch state information for the network, wherein the switch state information indicates that a configuration of the network has been updated,
detecting that a first link and a second link provide two different paths between two of the switches;
selecting the first link as a primary link, the selecting responsive to the network configuration data;
deactivating the second link in response to the selecting;
responsive to the switch state information indicating that the configuration of the network has been updated, routing data to a new root switch responsive to contents of at least one of the network configuration data and the switch state information indicating that the new root switch has been added to the network; and
routing data to an existing root switch responsive to contents of at least one of the network configuration data and the switch state information indicating that one of a plurality of existing root switches has been removed from the network and that the existing root switch remains in the network.

2. The system of claim 1, wherein the switch state information indicates that a primary link has been repaired and re-activated, and responsive to the indication, the method further comprises:
  locating a back-up link corresponding to the primary link, the locating in response to at least one of the network configuration data and the switch state information; and
  deactivating the back-up link in response to the selecting.

\* \* \* \* \*